(12) United States Patent
Watanabe et al.

(10) Patent No.: US 12,292,097 B2
(45) Date of Patent: May 6, 2025

(54) ROTARY DAMPER

(71) Applicant: OILES CORPORATION, Tokyo (JP)

(72) Inventors: Hiroshi Watanabe, Fujisawa (JP);
Kenichi Okumura, Fujisawa (JP);
Wataru Nishioka, Fujisawa (JP);
Ryohei Kaneko, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 220 days.

(21) Appl. No.: 18/252,851

(22) PCT Filed: Sep. 6, 2021

(86) PCT No.: PCT/JP2021/032745
§ 371 (c)(1),
(2) Date: May 12, 2023

(87) PCT Pub. No.: WO2022/107423
PCT Pub. Date: May 27, 2022

(65) Prior Publication Data
US 2024/0003398 A1    Jan. 4, 2024

(30) Foreign Application Priority Data
Nov. 19, 2020    (JP) .................................. 2020-192521

(51) Int. Cl.
*F16F 9/14*    (2006.01)
*A47C 1/024*    (2006.01)

(52) U.S. Cl.
CPC .............. *F16F 9/145* (2013.01); *A47C 1/024* (2013.01)

(58) Field of Classification Search
CPC .................................. A47C 1/024; F16F 9/145
(Continued)

(56) References Cited

U.S. PATENT DOCUMENTS

| | | | |
|---|---|---|---|
| 5,497,863 A * | 3/1996 | Schmidt .................... | F16F 9/12 |
| | | | 188/306 |
| 6,390,255 B2* | 5/2002 | Kobori .................... | F16F 9/145 |
| | | | 188/293 |

(Continued)

FOREIGN PATENT DOCUMENTS

| | | |
|---|---|---|
| DE | 202017106210 U1 | 10/2017 |
| JP | H0727163 A | 1/1995 |

(Continued)

OTHER PUBLICATIONS

Extended European Search Report dated Sep. 10, 2024 issued in European Application No. 21894298.5 (6 pages).

(Continued)

*Primary Examiner* — Thomas W Irvin
(74) *Attorney, Agent, or Firm* — Nixon & Vanderhye P.C.

(57) ABSTRACT

The present invention enables a simple structure to provide an easy adjustment of damping torque to be caused by applied rotation.

The rotary damper (1) is intend to limit movement of viscous fluid filled in a circular cylindrical chamber (111), thereby generating a damping torque in response to an applied rotational force. The lid (15) is the screw-on type capable of being screwed into the casing (11), and thus adjusting a clearance gap G1 between the lid (15) and each partition (115) by way of changing the screwing amount of the lid (15) into the casing (11) allows amount of viscous fluid moving through the clearance gap G1 to be adjusted, thereby resulting in adjustment of a damping torque to be caused by rotation. In addition, each axial force generation member (17) includes a plastically or elastically deformable element and is located between the lid (15) and the corresponding partition (115) to apply a reaction force to the lid (15). This causes screwing the lid (15) into the casing (11) to generate an axial force, thereby preventing external-leakage of the (Continued)

(A)

(B)

viscous fluid via a threaded interface between the lid (15) and the casing (11), and allows the leeway for the adjustment of the clearance gap G1 to increase.

20 Claims, 11 Drawing Sheets

(58) Field of Classification Search
USPC .................................................. 188/306, 307
See application file for complete search history.

(56) References Cited

U.S. PATENT DOCUMENTS

| | | | | |
|---|---|---|---|---|
| 6,725,984 | B2* | 4/2004 | Orita | E05F 5/10 |
| | | | | 188/290 |
| 7,111,712 | B2* | 9/2006 | Orita | F16F 9/48 |
| | | | | 188/290 |
| 10,400,846 | B2* | 9/2019 | Horita | F16F 9/44 |
| 10,875,423 | B2* | 12/2020 | Löhken | B60N 2/20 |
| 10,900,536 | B2* | 1/2021 | Watanabe | F16J 15/16 |
| 11,083,349 | B2* | 8/2021 | Mihara | F16F 9/12 |
| 11,179,013 | B2* | 11/2021 | Mihara | F16F 9/3242 |
| 11,287,008 | B2* | 3/2022 | Watanabe | F16F 9/369 |
| 11,603,899 | B2* | 3/2023 | Simura | F16F 9/12 |
| 11,732,517 | B2* | 8/2023 | Yoshida | E05F 3/14 |
| | | | | 16/327 |
| 12,162,455 | B2* | 12/2024 | Kaneko | B60T 7/06 |
| 2002/0007993 | A1* | 1/2002 | Kobori | F16F 9/145 |
| | | | | 188/290 |
| 2002/0179387 | A1* | 12/2002 | Orita | E05F 5/10 |
| | | | | 188/290 |
| 2003/0150678 | A1* | 8/2003 | Iwashita | A47K 13/12 |
| | | | | 188/290 |
| 2011/0139558 | A1* | 6/2011 | Cultraro | F16F 9/516 |
| | | | | 188/322.19 |
| 2017/0321780 | A1* | 11/2017 | Horita | F16F 9/125 |
| 2019/0070978 | A1* | 3/2019 | Löhken | F16F 9/145 |
| 2019/0331190 | A1* | 10/2019 | Watanabe | F16F 9/145 |
| 2020/0096074 | A1* | 3/2020 | Orita | F16F 9/516 |
| 2020/0200230 | A1 | 6/2020 | Honda | |
| 2020/0318706 | A1* | 10/2020 | Watanabe | F16F 9/32 |
| 2021/0196087 | A1* | 7/2021 | Mihara | F16F 9/14 |
| 2021/0196088 | A1* | 7/2021 | Mihara | F16F 9/3242 |
| 2021/0270343 | A1* | 9/2021 | Battlogg | F16F 9/145 |
| 2024/0239310 | A1* | 7/2024 | Kaneko | F16J 15/545 |

FOREIGN PATENT DOCUMENTS

| | | |
|---|---|---|
| JP | H07301272 A | 11/1995 |
| JP | H08303513 A | 11/1996 |
| JP | 2007198444 A | 8/2007 |
| JP | 2016090037 A | 5/2016 |
| JP | 2019100532 A | 6/2019 |

OTHER PUBLICATIONS

International Search Report for PCT/JP2021/032745 mailed Oct. 26, 2021, 5 pages, including English translation.
Written Opinion of the ISA for PCT/JP2021/032745 mailed Oct. 26, 2021, 4 pages.

* cited by examiner

Fig. 7
(A)
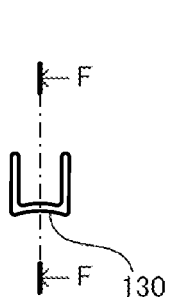
(B)
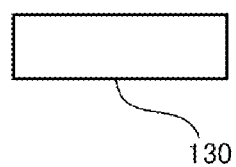
(C)
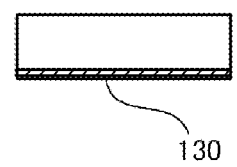

ROTARY DAMPER

CROSS-REFERENCE TO RELATED APPLICATIONS

This application is the U.S. national phase of International Application No. PCT/JP2021/032745 filed Sep. 6, 2021, which designated the U.S. and claims priority to JP 2020-192521 filed Nov. 19, 2020, the entire contents of each of which are hereby incorporated by reference.

TECHNICAL FIELD

The present invention relates to a rotary damper, and in particular relates to a rotary damper with adjustable damping torque to be caused by applied rotation.

BACKGROUND ART

A known damper generates a large damping torque in relation to a rotation in a forward direction, whereas a small damping torque in relation to a rotation in a backward direction. For example, the Patent Literature 1 discloses a rotary damper that has a simple structure thereby enabling manufacture at low cost.

The rotary damper disclosed in the Patent Literature 1 has the following: a casing including a circular cylindrical chamber defined inside; a rotor rotatably placed in the circular cylindrical chamber; a viscous fluid filled in the circular cylindrical chamber; and a lid attached to an opening end of the casing and keeping the rotor together with the viscous fluid sealed inside the circular cylindrical chamber.

The rotor includes a rotor body in cylindrical shape and vanes, and each vane is formed projecting radially outward from an outer circumferential surface of the rotor body so as to form a slight clearance gap with a sidewall surface inside the circular cylindrical chamber. The vanes each have a flow passage leading to two side surfaces perpendicular to a rotation direction of the rotor: one side surface (hereinafter referred to as the first side surface) and another side surface (hereinafter referred to as the e second side surface) of the vane. A Seal member is attached to the end surface (the surface facing the sidewall surface inside the circular cylindrical chamber) of each vane, thereby filling the slight clearance gap between the end surface and the sidewall surface inside the circular cylindrical chamber. These seal members each have a check valve of elasticity for opening and closing the flow passage formed in the corresponding vane. The sidewall surface inside the circular cylindrical chamber has partitions, each being formed projecting radially inward so as to form a clearance gap with the outer circumferential surface of the rotor body.

According to the above structure, in the rotary damper disclosed in the Patent Literature 1, applying a force to rotate the rotor in a direction from the first side surface to the second side surface of each vane (in a forward direction) on the rotor causes the viscous fluid in the circular cylindrical chamber to push each check valve against the second side surface of the corresponding vane, thereby closing the flow passages with the respective check valves. This allows only movement of the viscous fluid via the clearance gap between each partition of the circular cylindrical chamber and the outer circumferential surface of the rotor body and via a clearance gap between a closing end (a bottom surface) of the casing and a undersurface (a surface facing the closing end of the casing) of each vane, thereby increasing pressure on the viscous fluid in a section facing the second side surface of each vane. This generates a large damping torque. Conversely applying a force to rotate the rotor in a direction from the second side surface to the first side surface of each vane (in a backward direction) on the rotor causes the viscous fluid to flow from a section facing the first side surface of each vane into the corresponding flow passage and to push up the corresponding check valve, resulting in open state of each flow passage. Therefore, movement of the viscous fluid via the flow passage formed in each vane is also allowed, thus not increasing the pressure on the viscous fluid in the section facing the first end surface of each vane. This generates a small damping torque.

The rotary damper disclosed in the Patent Literature 1 further includes a damping force adjustment mechanism for adjusting the large damping torque that is to generate when the rotor is subjected to the force to rotate the rotor in the forward directions. This damping force adjustment mechanism has an elastic member arranged to be interposed between the opening end of the casing and the lid, and a plurality of bolts for fixation of the lid on the opening end of the casing with the elastic member interposed. A plurality of threaded holes are formed in the opening end of the casing, and through holes are formed in respective positions corresponding to these threaded holes so as to pass through the elastic member and the lid. The bolts are each inserted into the corresponding through hole through the lid and the elastic member and then screwed into the corresponding threaded hole formed in the opening end of the casing. A displacement of the rotor that is push in the circular cylindrical chamber of casing by the lid is controlled according to how tight the bolts are each tightened. Resultantly, the clearance gap between the closing end of the casing and an undersurface of each vane is adjusted, which enables adjustment of the large damping torque that is to generate when the rotor is subject to the force to rotate the rotor in the forward direction.

CITATION LIST

Patent Literature

Patent Literature 1: Japanese Unexamined Patent Application Laid-Open No. H07-301272

SUMMARY OF INVENTION

Technical Problem

However, the damping force adjustment mechanism of the rotary damper disclosed in the Patent Literature 1 has the elastic member arranged to be interposed between the opening end of the casing and the lid and a plurality of the bolts for fixation of the lid on the opening end of the casing with the elastic member interposed therebetween, therefore resulting in increase in component count of the rotary damper. In order to appropriately place the rotor in the circular cylindrical chamber, the bolts are intended to be all tightened equally so that the lid can push the rotor uniformly over entire surface of the lid. This leads to complicated adjustment of the damping torque.

The present invention has been made in view of the above situation, and an object of the present invention is to provide a rotary damper in which a simple structure provides an easy adjustment of a damping torque to be caused by applied rotation.

Solution to Problem

In response to the above issue, the present invention uses, in a rotary damper configured to limit a movement of a filled viscous fluid to generate a damping torque in reaction to an applied rotating force, a lid of the screw-on type to be screwed into the casing, and thereby adjusting a clearance gap between the lid and each vane by way of changing a screwing amount of the lid into the casing allows an adjustment of an amount of the viscous fluid moving through these gaps. This enables an adjustment of a damping torque to be caused by applied rotation. In addition, between the lid and each partition of a circular cylindrical chamber is located an axial force generation member which includes a plastically deformable or elastically deformable elements and which is to apply a reaction force on the lid. Therefore, screwing the lid into the casing causes an axial force, resulting in prevention of external-leakage of the viscous fluid through the threaded interface between the lid and the casing; and allows a leeway for adjustment of the clearance gap between the lid and each vane to increase, resulting in wider adjustment range of the damping torque.

For example, the present invention provided a rotary damper for limiting a movement of a viscous fluid to generate a damping torque in reaction to a rotating force applied, and the rotary damper has the following:

a casing having an opening end on one side and including a circular cylindrical chamber defined inside, the circular cylindrical chamber being filled by the viscous fluid;

a rotor being placed in the circular cylindrical chamber and being rotatable relative to the circular cylindrical chamber; and a lid attached to the opening end of the casing and keeping the rotor together with the viscous fluid sealed inside the circular cylindrical chamber.

The rotor has the following:

a rotor body in cylindrical shape; and a vane projecting radially outward from an outer circumferential surface of the rotor body and placing a front end surface of the vane close to a sidewall surface inside the circular cylindrical chamber to partition an inside of the circular cylindrical chamber.

The casing has the following:

a partition projecting radially inward from the sidewall surface inside the circular cylindrical chamber and placing a front end surface of the partition close to the outer circumferential surface of the rotor body to partition the inside of the circular cylindrical chamber; and a first threaded portion formed on the opening end of the casing.

The lid has a second threaded portion formed on the lid and engaged with the first threaded portion formed on the opening end of the casing.

The rotary damper further has an axial force generation member, and the axial force generation member includes a plastically or elastically deformable element and is located between a back face of the lid and a facing surface of the partition to the back face of the lid so that screwing the second threaded portion of the lid onto the first threaded portion of the casing causes the axial force generation member to generate an axial force. A clearance gap adjustable by way of adjustment of a screwing amount of the second threaded portion of the lid onto the first threaded portion of the casing is defined between the back face of the lid and the facing surface of the vane to the back face of the lid to act as a flow passage for limiting the movement of the viscous fluid.

Here, the rotary damper may optionally further have a first seal member sealing a clearance gap between the front surface of the partition and the outer circumferential surface of the rotor body. The rotary damper may optionally further have a second seal member sealing a clearance gap between the front end surface of the vane and the sidewall surface inside the circular cylindrical chamber.

The rotary damper may further have the following:

a flow passage formed in the partition or in the vane and passing through both side surfaces of the partition or the vane along rotation directions of the rotor; and a check valve configured to close the flow passage upon rotating the rotor in a forward direction relative to the circular cylindrical chamber and to open the flow passage upon rotating the rotor in a backward direction relative to the circular cylindrical chamber.

Here, for the rotary damper having the first seal member or the second seal member, the check valve may be integrally formed on the first seal member or the second seal member.

Advantageous Effects of Invention

According to the present invention, using the lid of the screw-on type capable of being screwed into the casing enables the clearance gap between the lid and the vane to be adjusted by way of adjustment of the screwing amount of the lid into casing. Therefore, without increasing component count, adjustment of an amount of movement of the viscous fluid through this clearance gap can be made with a simple structure and an easy operation, resulting in adjustment of a damping torque to be caused by applied rotation.

Moreover, according to the present invention, between the lid and the partition of the circular cylindrical chamber is located the axial force generation member which includes the plastically or elastically deformable element and which is to apply a reaction force to the lid. This allows screwing the lid into the casing to generate the axial force, thereby preventing external-leakage of the viscous fluid through a threaded interface between the lid and the casing; and allows the leeway for the adjustment of the clearance gap between the lid and each vane to increase, resulting in wider adjustment range of the damping torque.

BRIEF DESCRIPTION OF DRAWINGS

FIG. 7(A) and FIG. 7(B) are a front view and a side view of a first seal member 13, respectively; and FIG. 7(C) is an F-F cross sectional view of the first seal member 13 illustrated in FIG. 7(A).

DESCRIPTION OF EMBODIMENTS

In the following, one embodiment of the present invention will be described with reference to the drawings.

Figure 1:
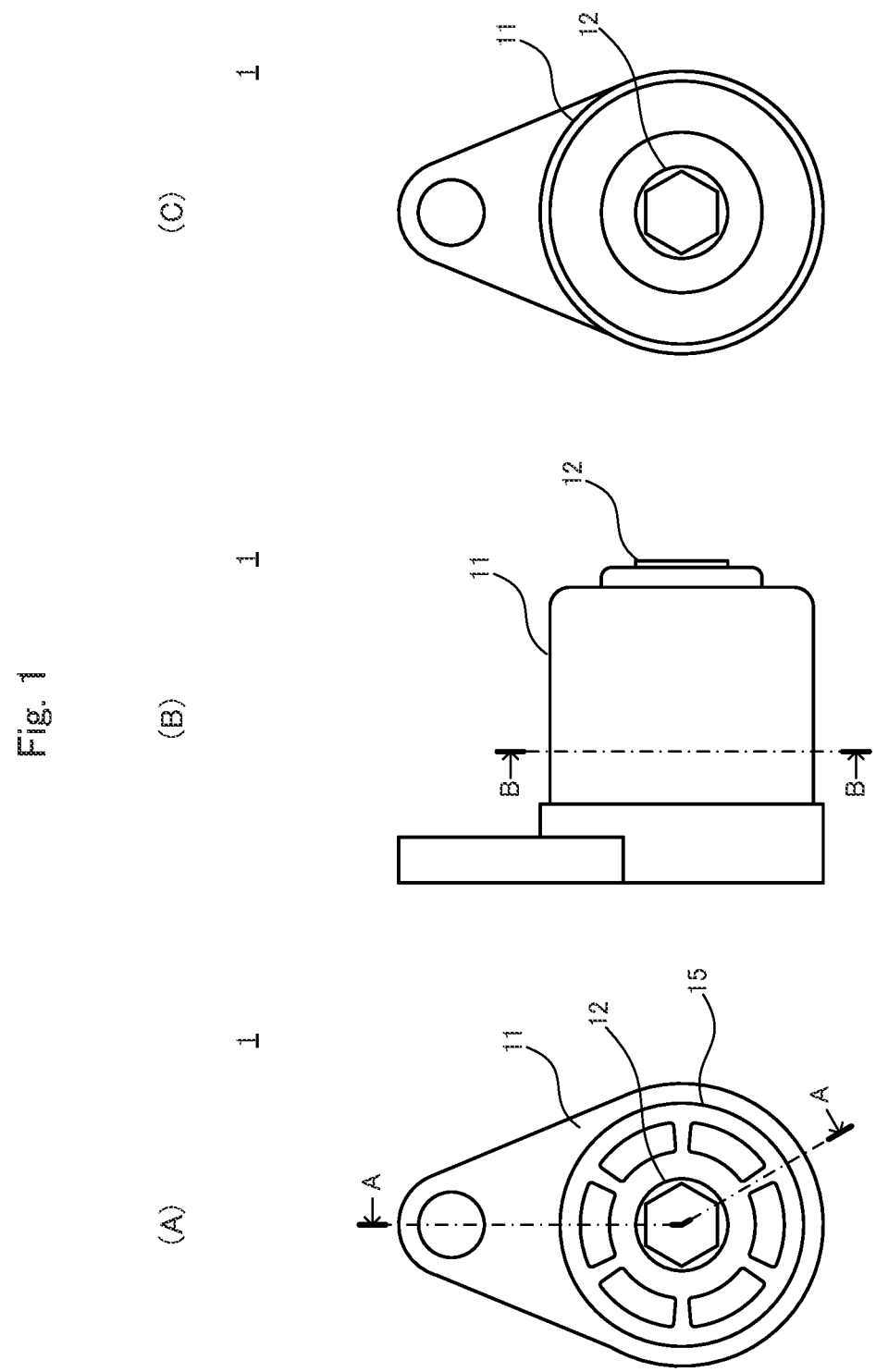
FIG. 1(A) to FIG. 1(C) are a front view, a side view, and a back view, of a rotary damper 1 according to one embodiment of the present invention, respectively.
Figure 2:
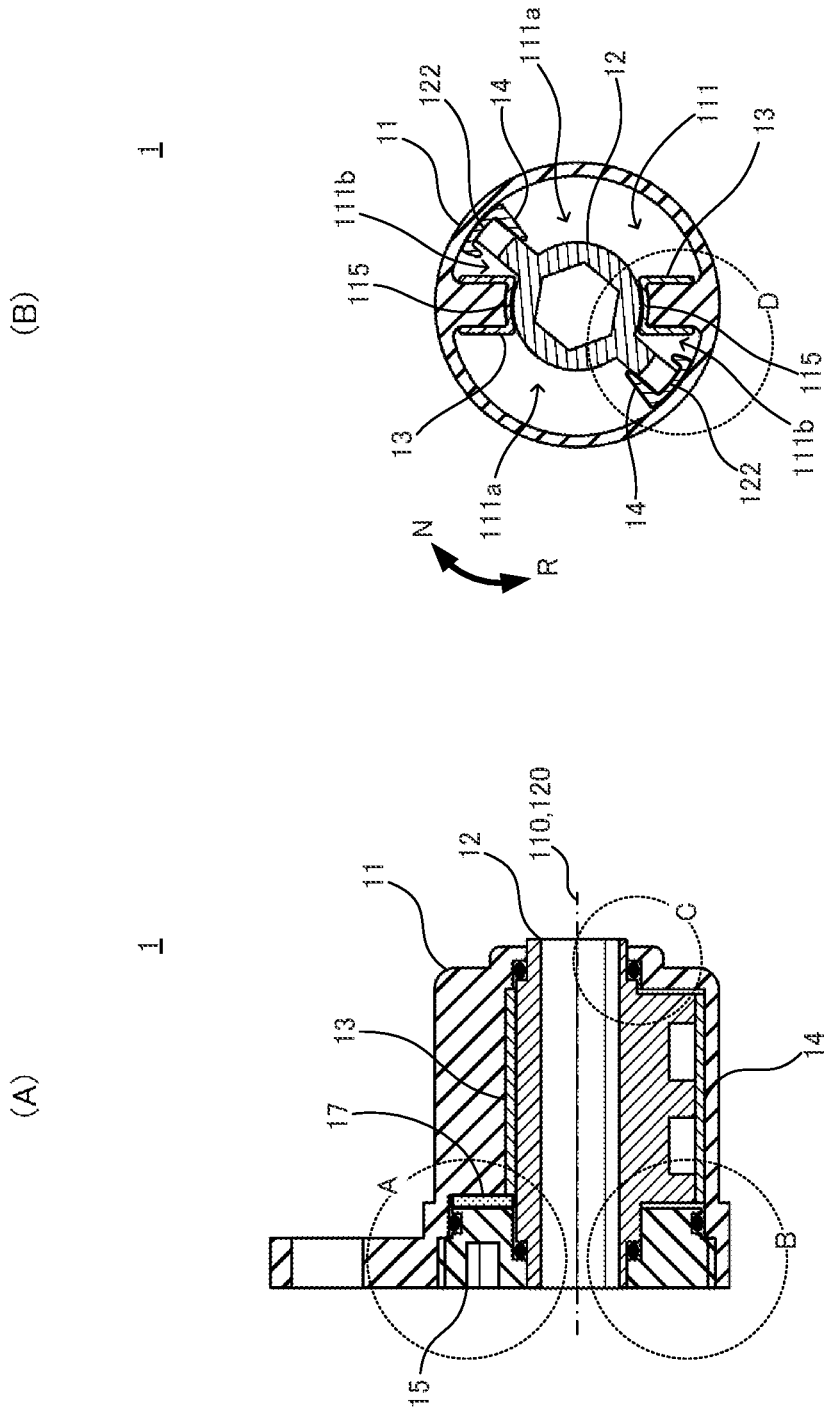
FIG. 2(A) is an A-A cross sectional view of the rotary damper 1 illustrated in FIG. 1(A) and FIG. 2(B) is a B-B cross sectional view of the rotary damper 1 illustrated in FIG. 1(B).
Figure 3:
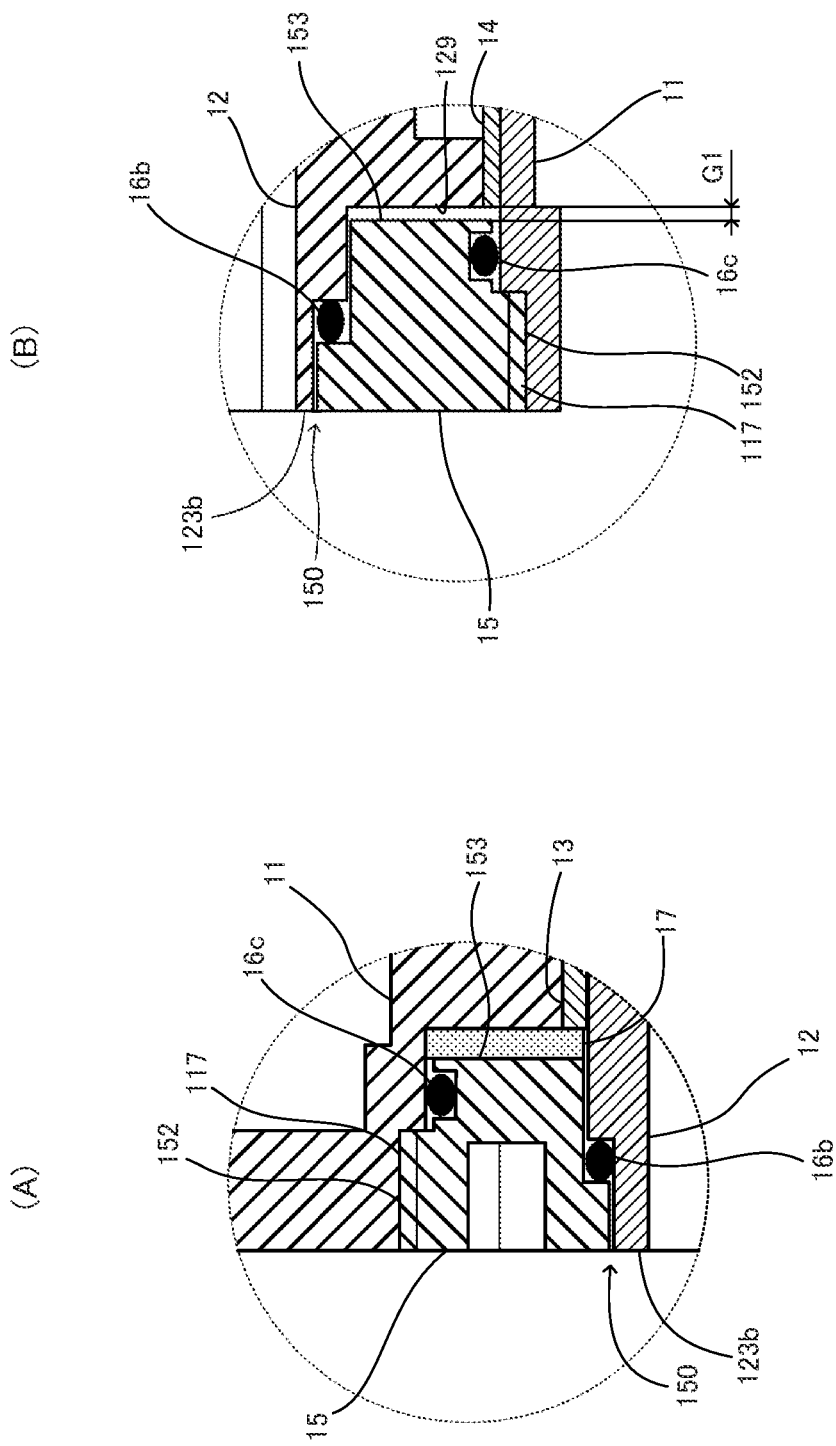
FIG. 3(A) and FIG. 3(B) are an enlarged view of the part A and an enlarged view of the part B, of the rotary damper 1 illustrated in FIG. 2(A), respectively.
Figure 4:
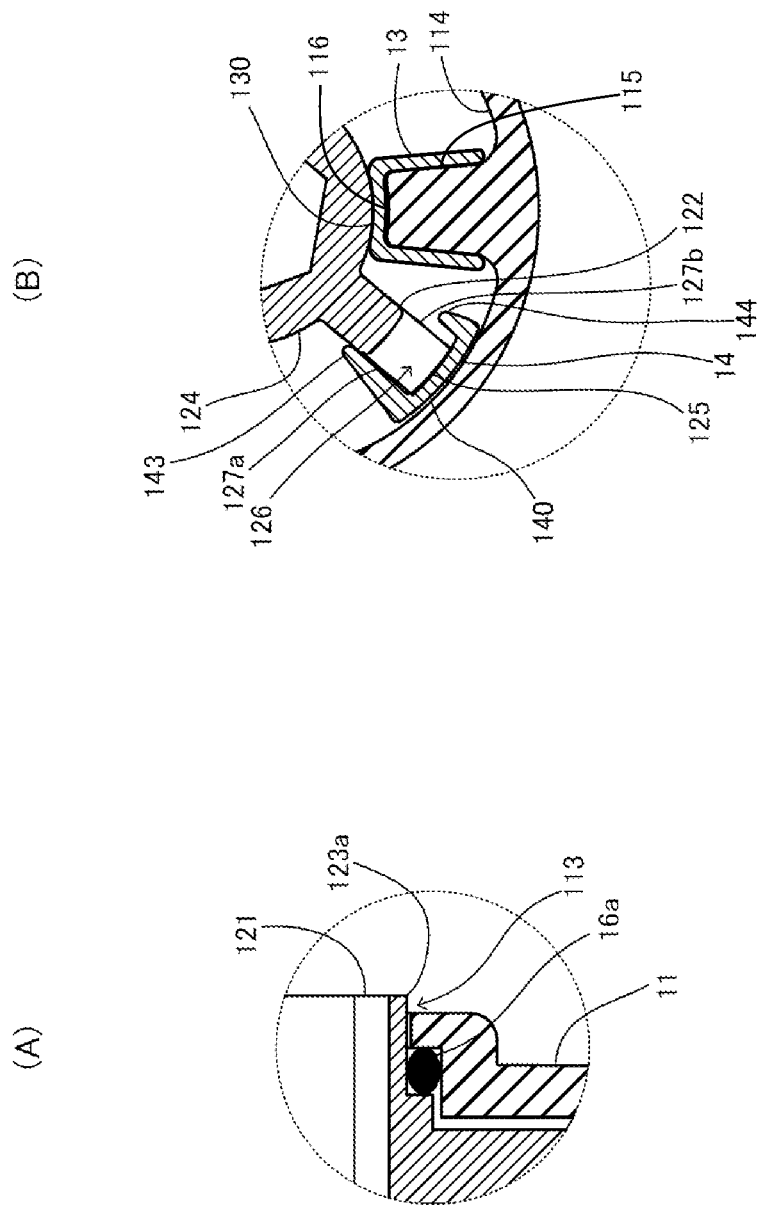
FIG. 4(A) is an enlarged view of the part C of the rotary damper 1 illustrated in FIG. 2(A) and FIG. 4(B) is an enlarged view of the part D of the rotary damper 1 illustrated in FIG. 2(B).

FIG. 1(A) to FIG. 1(C) are a front view, a side view, and a back view, of a rotary damper 1 according to the embodiment of the present invention, respectively. FIG. 2(A) is an A-A cross sectional view of the rotary damper 1 illustrated in FIG. 1(A) and FIG. 2(B) is a B-B cross sectional view of the rotary damper 1 illustrated in FIG. 1(B). FIG. 3(A) and FIG. 3(B) are an enlarged view of the part A and an enlarged view of the part B, of the rotary damper 1 illustrated in FIG. 2(A), respectively. FIG. 4(A) is an enlarged view of the part C of the rotary damper 1 illustrated in FIG. 2(A) and FIG. 4(B) is an enlarged view of the part D of the rotary damper 1 illustrated in FIG. 2(B).

As illustrated in the figures, the rotary damper 1 according to the present embodiment, includes the following: a casing 11; a rotor 12 contained in the casing 11 rotatably relative to the casing 11; viscous fluid (not illustrated), such as silicone oil, filled in the casing 11; a lid 15 keeping the rotor 12 together with the viscous fluid sealed inside the casing 11; and a pair of axial force generation members 17.

Figure 5:
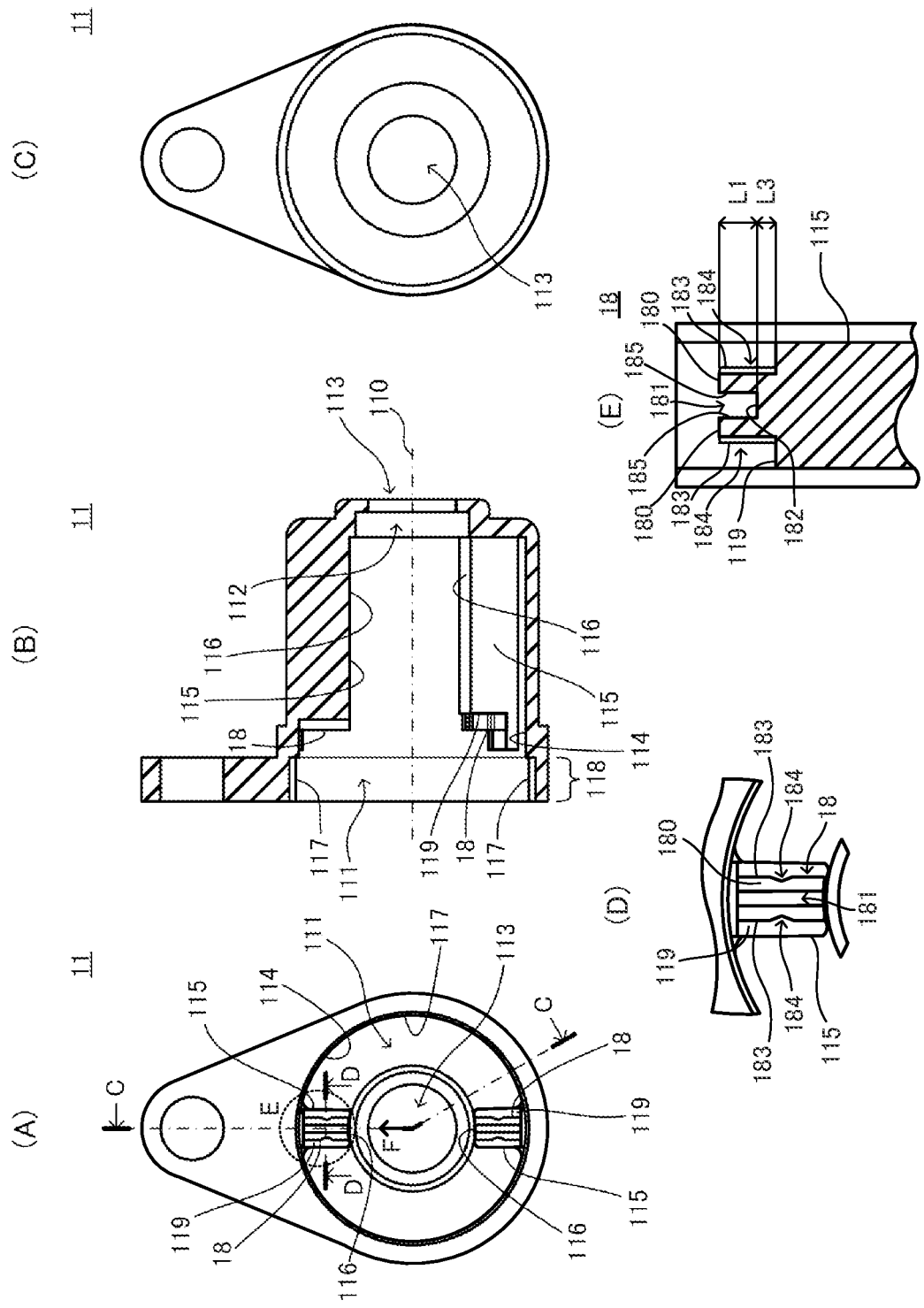
FIG. 5(A) is a front view of a casing 11.
FIG. 5(B) is a C-C cross sectional view of the casing 11 illustrated in FIG. 5(A)
FIG. 5(C) is a back view of the casing 11.
FIG. 5(D) is an enlarged view of the part E of the casing 11 illustrated in FIG. 5(A)
FIG. 5(E) is an enlarged D-D cross-sectional view of the casing 11 illustrated in FIG. 5(A).

FIG. 5(A) is a front view of the casing 1, FIG. 5(B) is a C-C cross sectional view of the casing 11 illustrated in FIG. 5(A), FIG. 5(C) is a back view of the casing 11, FIG. 5(D) is an enlarged view of the part E of the casing 11 illustrated in FIG. 5(A), and FIG. 5(E) is an enlarged D-D cross-sectional view of the casing 11 illustrated in FIG. 5(A).

Figure 6:
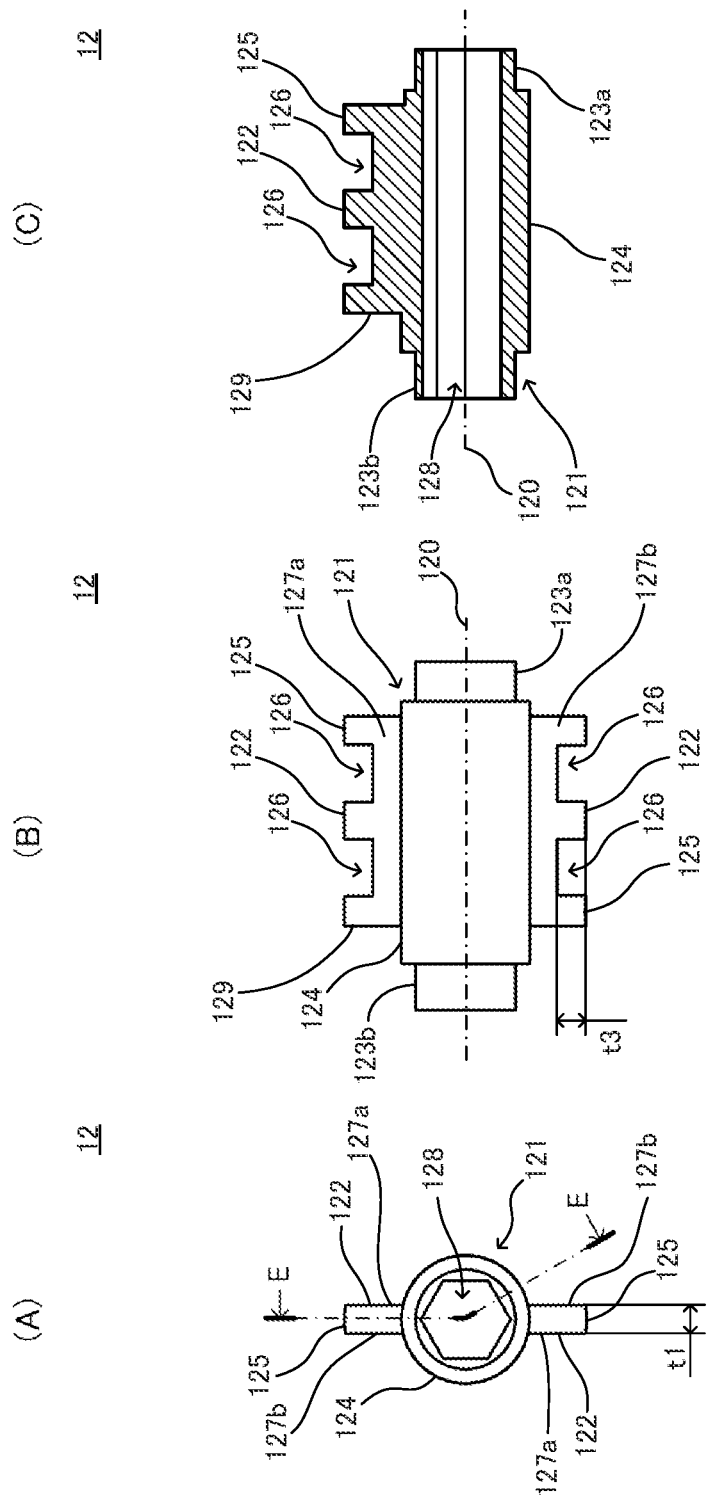
FIG. 6(A) and FIG. 6(B) are a front view and a side view of a rotor 12, respectively.
FIG. 6(C) is an E-E cross sectional view of the rotor 12 illustrated in FIG. 6(A).

As illustrated in the figures, the casing 11, which made of metal, such as aluminum, includes a circular cylindrical chamber 111 defined inside and open at one end (i.e. a space having a circular cylinder shape with a bottom), and an opening section 113 for insertion of the rotor 12 is formed through a bottom 112 of the casing 11. Inserting a lower end portion 123a (See FIG. 6) of a rotor body 121 (as described below) into this opening section 113 places the rotor 12 in the circular cylindrical chamber 111 such that a rotation axis 120 of the rotor 12 is aligned with a center line 110 of the circular cylindrical chamber 111 (See FIG. 2(A)). An sidewall surface 114 inside the circular cylindrical chamber 111 has a pair of partitions 115 each formed thereon along the center line 110 of the circular cylindrical chamber 111, and the partitions 115 are axisymmetrically arranged with respect to the center line 110 and projected radially inward so as to place respective front end surfaces 116 close to an outer circumferential surface 124 (See FIG. 6) of the rotor body 121 (as described below) of the rotor 12, thereby partitioning an inside of the circular cylindrical chamber 111.

Figure 9:
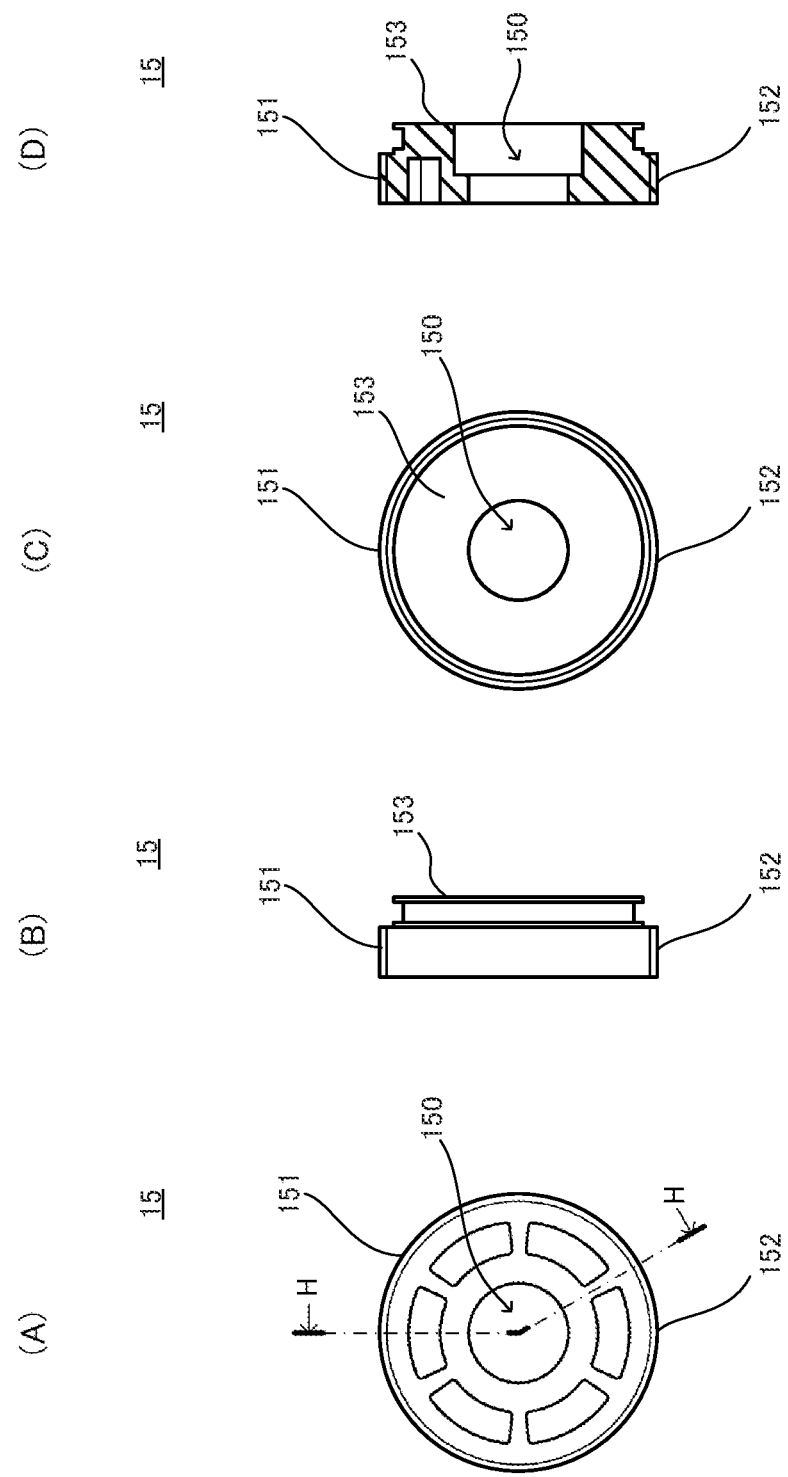
FIG. 9(A) to FIG. 9(C) are a front view, a side view, and a back view, of a lid 15, respectively.
FIG. 9(D) is an H-H cross sectional view of the lid 15 illustrated in FIG. 9(A).
Figure 10:
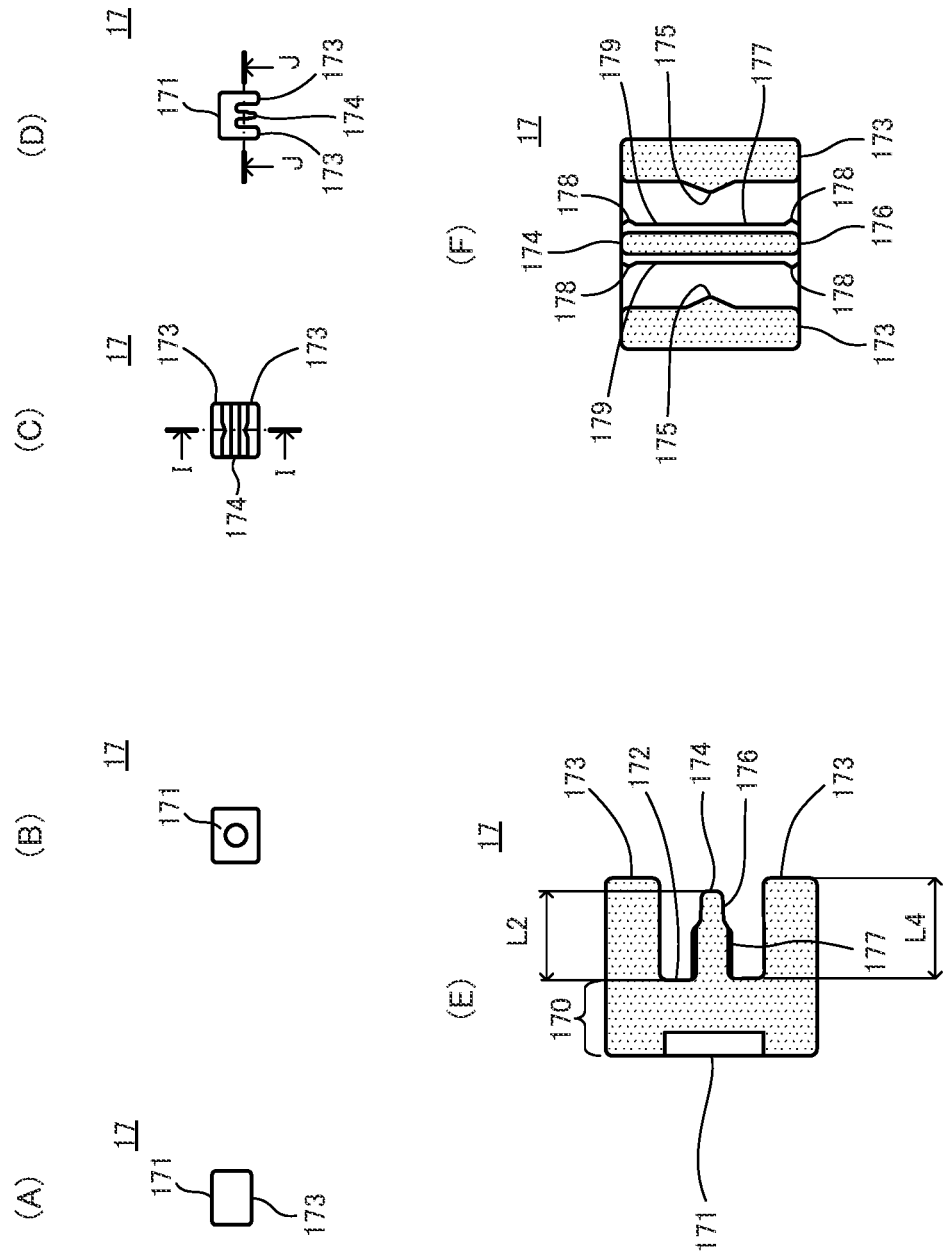
FIG. 10(A) to FIG. 10(D) are a front view, a top view, a bottom view, and a side view, of an axial force generation member 17, respectively.
FIG. 10(E) is an enlarged I-I cross-sectional view of the axial force generation member 17 illustrated in FIG. 10(C)
FIG. 10(F) is an enlarged J-J cross-sectional view of the axial force generation member 17 illustrated in FIG. 10(D).

A first seal member 13 (See FIG. 4(B)) as described below, is attached to each of the paired partitions 115. The paired partitions 115 have protrusions 18 formed on respective top surfaces 119 that are facing surfaces to a back face 153 (See FIG. 9) of the lid 15, thereby allowing attachment of the axial force generation members 17. A top surface 180 of each protrusion 18 has a groove 181 defined thereon along a radial direction of the circular cylindrical chamber 111 so as to allow insertion of an adjustment portion 174 (as described below) of the axial force generation member 17 into the groove 181, and a groove bottom 182 of the groove 181 is located closer to the lid 15 than the top surface 119 of the corresponding partition 115 is. Both side surfaces 183 of each protrusion 18, which are arranged along a radial direction of the casing 11, include respective grooves 184 defined thereon along the center line 110 of the circular cylindrical chamber 111, thereby allowing attachment of pushing portions 175 (as described below) of the corresponding axial force generation member 17 to the grooves 184.

An internal threaded portion 117 is formed, as a first threaded portion, on an opening side 118 of the sidewall surface 114 inside the circular cylindrical chamber 111 and is to engage with an external threaded portion 152 (as describe as below) (See FIG. 9) of the lid 15.

FIG. 6(A) and FIG. 6(B) are a front view and a side view of the rotor 12, respectively; and FIG. 6(C) is an E-E cross sectional view of the rotor 12 illustrated in FIG. 6(A).

The rotor 12, which is made of thermoplastic resin, such as polyamide resin, has the rotor body 121 in cylindrical shape and a pair of vanes (rotating blades) 122 axisymmetrically formed with respect to the rotation axis 120 of the rotor 12, as illustrated in the figures. The vanes 122 are arranged along the rotation axis 120 of the rotor 12 and formed projecting radially outward from the outer circumferential surface 124 of the rotor body 121 so as to place respective front end surfaces 125 close to the sidewall surface 114 of the circular cylindrical chamber 111 in the casing 11, thereby partitioning the inside of the circular cylindrical chamber 111. Each of the vanes 122 has a flow passages 126 passing through both side surfaces 127a, 127b of the vane 122 along rotation directions of the rotor 12. A second seal member 14 as described below is attached to each of the paired vanes 122 (See FIG. 4(B)).

The rotor body 121 includes a through hole 128 centered around the rotation axis 120 to allow insertion of a hexagonal shaft (not illustrated) for transmitting an external rotational force to the rotor 12. The lower end portion 123a of the rotor body 121 is rotatably inserted in the opening section 113 formed on the bottom 112 of the circular cylindrical chamber 111 in the casing 11 (See FIG. 4(A)), and a upper end portion 123b of the rotor body 121 is rotatably inserted in an opening section 150 (as described below) (See FIG. 9) of the lid 15 (See FIG. 3(A), (B)).

In order to prevent external-leakage of the viscous fluid through the opening section 113 of the circular cylindrical chamber 111, a seal member, such as an O-ring 16a, may be interposed between the lower end portion 123a of the rotor body 121 and the opening section 113 of the circular cylindrical chamber 111 (See FIG. 4(A)).

FIG. 7(A) and FIG. 7(B) are a front view and a side view of the first seal member 13, respectively, and FIG. 7(C) is an F-F cross sectional view of the first seal member 13 illustrated in FIG. 7(A).

As illustrated in the figures, Each of the first seal member 13 has a U-shape to allow attachment to one of the partitions 115 formed in the circular cylindrical chamber 111 in the casing 11 and interposes its bottom portion 130 between the front end surface 116 of the corresponding partition 115 and the outer circumferential surface 124 of the rotor body 121 of the rotor 12, thereby filling a clearance gap therebetween (See FIG. 4(B)). Each first seal member 13 is located between the casing 11 and the rotor 12 that are to rotate relatively, and thus resin excellent in sliding properties, such as polyamide, may be used as a preferable material thereof.

Figure 8:
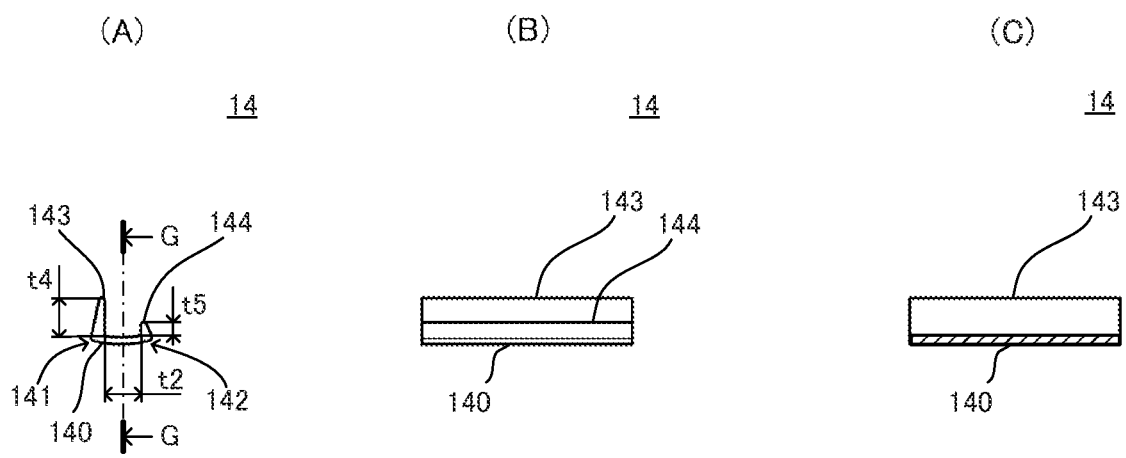
FIG. 8(A) and FIG. 8(B) are a front view and a side view of a second seal member 14, respectively.
FIG. 8(C) is a G-G cross sectional view of the second seal member 14 illustrated in FIG. 8(A).

FIG. 8(A) and FIG. 8(B) are a front view and a side view of the second seal member 14, respectively; and FIG. 8(C) is a G-G cross sectional view of the second seal member 14 illustrated in FIG. 8(A)

As illustrated in the figures, each of the second seal member 14 has a U-shape so as to allow attachment to the vane 122 of the rotor 12 and includes the following portions: a bottom portion 140 having a width t2 lager than a width t1 of the vane 122 in the rotation directions (See FIG. 6(A)); a first leg portion 143 integrally formed at one edge 141 of the bottom portion 140 and having a width t4 lager than a radial width t3 of the flow passage 126 defined in the vane 122 (See FIG. 6(B)); and a second leg portion 144 integrally formed at another edge 142 of the bottom portion 140 and having a width t5 smaller than the radial width t3 of the flow passage 126 defined in the vane 122.

Each of the second seal member 14 attached to the vanes 122 places its bottom portion 140 between the front-end surface 125 of the corresponding vane 122 and the sidewall surface 114 of the circular cylindrical chamber 111 in the casing 11, thereby closing a clearance gap therebetween (See FIG. 4(B)). As illustrated in FIG. 2(B), when the rotor 12 rotates in a forward direction N relative to the circular cylindrical chamber 111 in the casing 11, for each of the second seal members, the first leg portion 143 14 abuts one side surface 127a of the corresponding vane 122, thereby closing the corresponding flow passage 126 defined in the corresponding vane 122. Conversely, when the rotor 12 rotates in a backward direction R relative to the circular cylindrical chamber 111 in the casing 11, for each of the second seal members 14, the first leg portion 143 moves away from one side surface 127a of the corresponding vane 122 and then the second leg portion 144 abuts another side surface 127b of the corresponding vane 122, thereby opening the flow passage 126 formed in the corresponding vane 122. The second seal members 14 are located between the casing 11 and the rotor 12 that are relatively rotatable, and thus resin excellent in sliding properties, such as polyamide, may be used as a preferable but optional material thereof.

FIG. 9(A) to FIG. 9(C) are a front view, a side view, and a back view, of the lid 15, respectively; and FIG. 9(D) is an H-H cross sectional view of the lid 15 illustrated in FIG. 9(A)

As illustrated in the figures, the lid 15 has the opening section 150 for insertion of the upper end portion 123b of the rotor body 121 of the rotor 12, at a place facing the opening section 113 formed in the bottom 112 of the circular cylindrical chamber 111 in the casing 11. The lid 15 has, as a second threaded portion, the external threaded portion 152 formed in an outer circumferential surface 151 thereof, thereby allowing engagement of the external threaded portion 152 with the internal threaded portion 117 formed on the opening side 118 inside the sidewall surface 114 of the circular cylindrical chamber 111. A clearance gap G1 (See FIG. 3(B)) is defined between the undersurface (the back face) 153 of the lid 15 and a top surface 129 of each vane 122 of the rotor 12 and acts as a flow passage for the viscous fluid filled in the circular cylindrical chamber 111. These clearance gaps G1, which each is to act as the flow passage for the viscous fluid, are adjustable by way of adjustment of a screwing amount of the lid 15 into the casing 11 (an amount of engagement between the external threaded portion 152 of the lid 15 and the internal threaded portion 117 of the casing 11).

In order to prevent external-leakage of the viscous fluid through the opening section 150 of the lid 15, a seal member, such as an O-ring 16b, may be interposed between the upper end portion 123b of the rotor body 121 of the rotor 12 and the opening section 150 of the lid 15. Similarly, in order to prevent external-leakage of the viscous fluid through the threaded interface between the external threaded portion 152 of the lid 15 and the internal threaded portion 117 of the circular cylindrical chamber 111 in the casing 11, a seal member, such as an O-ring 16c, may be interposed between the outer circumferential surface 151 of the lid 15 and the sidewall surface 114 inside the circular cylindrical chamber 111 (See FIG. 3(A) and FIG. 3(B)).

Figure 11:
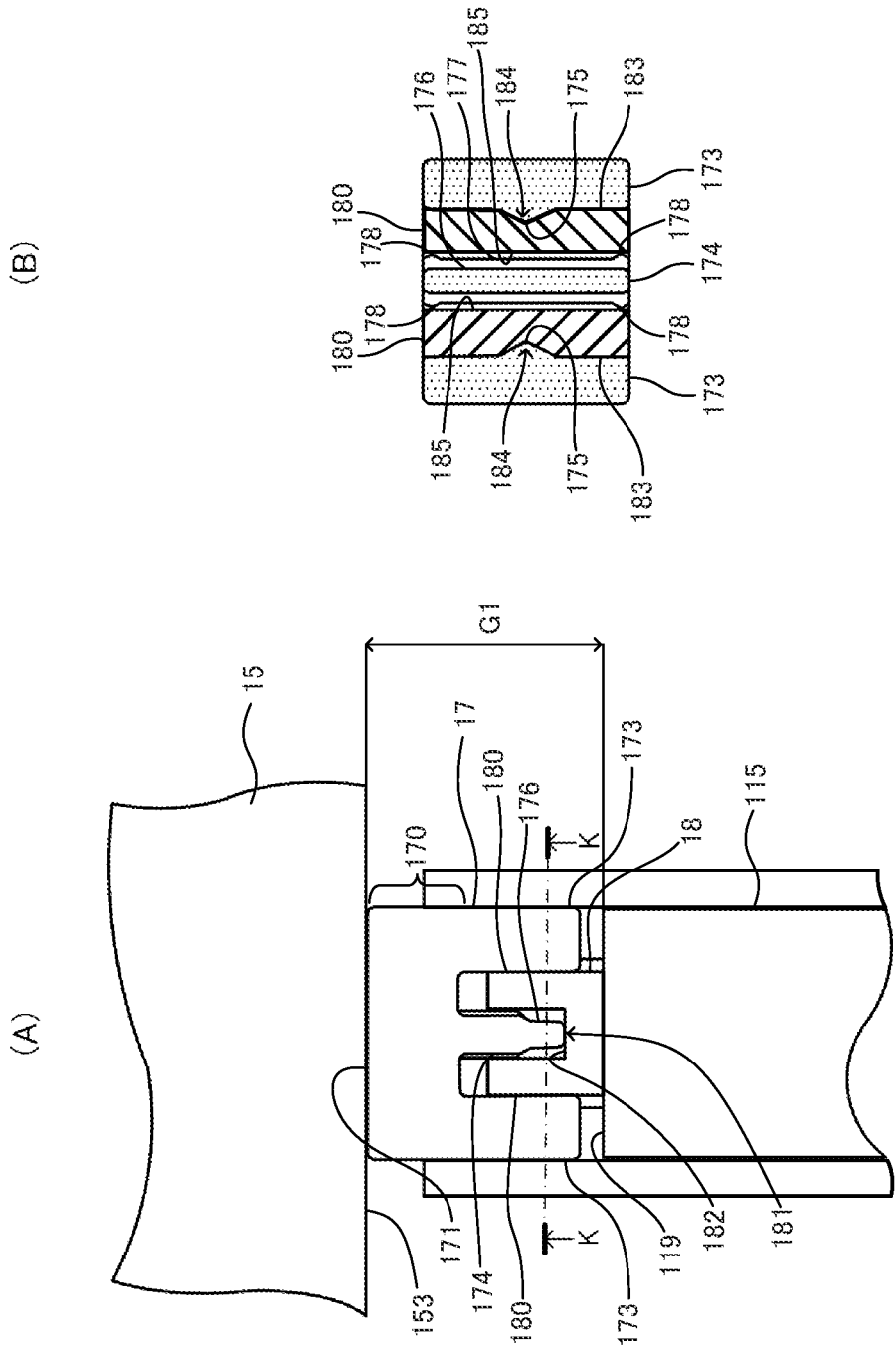
FIG. 11(A) is an enlarged view of the axial force generation member 17 as seen from a center of the rotary damper 1 according to the embodiment of the present invention, in which the axial force generation member 17 is attached to a protrusion 18 of a partition 115 of the casing 11.
FIG. 11(B) is an enlarged K-K cross-sectional view of the axial force generation member 17 illustrated in FIG. 11(A).

FIG. 10(A) to FIG. 10(D) are a front view, a top view, a bottom view, and a side view, of the axial force generation member 17, respectively; FIG. 10(E) is an enlarged I-I cross-sectional view of the axial force generation member 17 illustrated in FIG. 10(C); and FIG. 10(F) is an enlarged J-J cross-sectional view of the axial force generation member 17 illustrated in FIG. 10(D). FIG. 11(A) is an enlarged view of the axial force generation member 17 as seen from a center of the rotary damper 1 according to the embodiment of the present invention (equivalent to an arrow view of FIG. 5(A), in a direction of an arrow F), in which the axial force generation member 17 is attached to the protrusion 18 of the partition 115 of the casing 11; and FIG. 11(B) is an enlarged K-K cross-sectional view of the axial force generation member 17 illustrated in FIG. 11(A)

Each axial force generation members 17 is made of plastically deformable material, including thermoplastic resin, such as polyacetal, and sintered metal, or elastically deformable material, including natural rubber, synthetic rubber, and synthetic resin elastomer; and is attached to the protrusion 18 on the top surfaces 119 of the corresponding one of the paired partitions 115 of the casing 11 and interposed between the top surface 119 of the corresponding partition 115 and the back face 153 of the lid 15, thereby filling a clearance gap between the back face 153 of the lid 15 and the top surface 119 of the corresponding partition 115. Screwing the lid 15 into the casing 11 allows the axial force generation members 17 to cause an axial force.

As illustrated in the figures, each of the axial force generation members 17 includes a body 170 in rectangular shape having a top surface 171 to come into contact with the back face 153 of the lid 15; a pair of arm portions 173 formed on an undersurface 172 of the body 170 to pinch the both side surfaces 183 of the protrusion 18 formed on the top surface 119 of the corresponding partition 115 of the casing 11 and to grasp the protrusion 18; and an adjustment portion 174 located between the paired arm portions 173 and projecting toward the protrusion 18 so as to be inserted in the groove 181 of the protrusion 18.

The paired arm portions 173 have the respective pushing portions 175 to be push into and contact with the grooves 184 defined in the both side surfaces 183 of the protrusions 18. When the axial force generation member 17 is to be attached to the protrusion 18, the respective pushing portions 175, together with the grooves 184 in the both side surfaces 183 of the protrusion 18, act to ensure positioning. These pushing portions 175 cause a pair of the arm portions 173 to grip the axial force generation member 17 firmly so as not to drop the axial force generation members 17 from the protrusion 18. The paired arm portions 173 each have a length L4 (<L2+L3) less than a sum of a length L2 of the adjustment portion 174 and a length L3 (See FIG. 5(E)) from the top surface 119 of the partition 115 to the groove bottom 182 of the groove 181 of the protrusion 18 formed on the top surface 119.

The adjustment portion 174 has the length L2(>L) longer than a depth L1 (See FIG. 5(E)) of the groove 181 of the protrusion 18 formed on the top surface 119 of the partition 115, and its distal end 176 is narrower than its base portion 177 in width of thickness direction. Here, the groove 181 of the protrusion 18 has such a size that plastic or elastic deformation can be caused in the distal end 176 of the adjustment portion 174. The base portion 177 of the adjustment portion 174 has pushing surfaces 178 on both sides 179 in thickness direction so that the pushing surfaces 178 can contact with and push against both inner sidewalls 185 of the groove 181 of the protrusion 18. These pushing surfaces 178 cause the adjustment portion 174 to fit in the groove 181 of the protrusion 18, thereby ensuring more reliable prevention of drop of the axial force generation member 17 from the protrusion 18.

Since the paired arm portions 173 each have the length L4 less than a sum of the length L2 of the adjustment portion 174 and the length L3 form the top surface 119 of the partition 115 to the groove bottom 182 of the groove 181 of the protrusion 18 and the adjustment portion 174 has the length L2 longer than the depth L1 of the groove 181 of the protrusion 18, the distal end 176 of the adjustment portion 174 comes into contact with the groove bottom 182 of the groove 181 of the protrusion 18 without contact between the paired arm portions 173 and the top surface 119 of the partition 115. Since the groove 181 of the protrusion 18 has such a size that plastic or elastic deformation can be caused in the distal end 176 of the adjustment portion 174, screwing the lid 15 into the casing 11, while causes the axial force, causes plastically or elastically deformation not only in the body 170 but also in the distal end 176 of the adjustment portion 174 actively, thus allowing an increasing leeway for adjustment of the clearance gap G1 between the back face 153 of the lid 15 and the top surface 129 of each vane 122.

For the rotary damper 1 with above structures, when the rotor 12 rotates in the forward direction N relative to the circular cylindrical chamber 111 in the casing 11 (See FIG. 2(B)), the first leg portion 143 of each of the second seal members 14 abuts one side surface 127a of the corresponding vane 122, thereby closing the flow passage 126 defined in the corresponding vane 122. At this moment, each of the first seal members 13 attached to the partitions 115 of the circular cylindrical chamber 111 in the casing 11 is closing the clearance gap between the front end surface 116 of the corresponding partition 115 and the outer circumferential surface 124 of the rotor body 121 of the rotor 12, and each of the second seal members 14 attached the vanes 122 of the rotor 12 is closing the clearance gap between the front end surface 125 of the corresponding vane 122 and the sidewall surface 114 of the circular cylindrical chamber 111 in the casing 11 (See FIG. 4(B)). Accordingly, the movement of the viscous fluid filled in the circular cylindrical chamber 111 is only allowed via the clearance gap G1 between the back face 153 of the lid and the top surface 129 of each of the vanes 122, thereby leading to increased pressure on the viscous fluid in sections 111a (See FIG. 2(B)) each separated by the corresponding vane 122 and the partition 115 located in the forward direction N relative to the corresponding vane 122. This results in occurrence of a larger damping torque.

Here, the clearance gap G1 between the back face 153 of the lid 15 and the top surface 129 of each vane 122 is adjustable by way of adjustment of a screwing amount of the lid 15 into the casing 11 (an amount of engagement between the external threaded portion 152 of the lid 15 and the internal threaded portion 117 of the casing 11). Therefore, adjusting an amount of movement of the viscous fluid via the clearance gaps G1 enables adjustment of damping torque to be caused by applied rotation.

Moreover, the axial force generation members 17 are each located between the back face 153 of the lid 15 and the top surface 119 of the corresponding partition 115 to apply a reaction force to the lid 15; thus screwing the lid into the casing 11 allows the axial force generation members 17 to cause the axial force, thereby preventing external-leakage of the viscous fluid thorough the threaded interface between the external threaded portion 152 of the lid 15 and the internal threaded portion 117 of the casing 11, and allows an increasing leeway for adjustment of the clearance gap G1, resulting in wider adjustment range of the damping torque.

Conversely, when the rotor 12 rotates in the backward direction R relative to the circular cylindrical chamber 111 in the casing 11 (See FIG. 2(B)), the first leg portion 143 of each of the second seal members 14 moves away from one side surface 127a of the corresponding vane 122, thereby opening the flow passage 126 defined in the corresponding vane 122. Accordingly, the viscous fluid filled in the circular cylindrical chamber 111 is allowed to move not only via the clearance gap G1 between the back face 153 of the lid 15 and the top surface 129 of each vane 122 but also via the flow passage 126 defined in each vane 122, thus not leading to increased pressure on the viscous fluid in sections 111b (See FIG. 2(B)) each separated by the corresponding vane 122 and the partition 115 located in the backward direction R relative to corresponding vane 122 This results in occurrence of a small damping torque.

The embodiment has been hereinabove described.

According to the present embodiment, in the rotary damper 1 for limiting the movement of the filled viscous fluid to generate a damping torque in reaction to a rotating force applied, using the lid 15 of the screw-on type capable of being screwed into the casing 11 allows the clearance gap G1 between the back face 153 of the lid 15 and the top surface 129 of each vane 122 to be adjusted by way of a screwing amount of the lid 15 into the casing 11. Therefore, without increasing component count of the rotary damper, with a simple structure and an easy operation, adjustment of an amount of viscous fluid moving through each clearance gap G1 can be made resulting in adjustment of a damping torque to be caused by applied rotation.

According to the present embodiment, the axial force generation member 17 including plastically or elastically deformable element is located between the back face 153 of the lid 15 and the top surface 119 of the partition 115 to apply a reaction force to the lid 15; thus screwing of the lid 15 into the casing 11 allows the axial force generation members 17 to cause the axial force, thereby preventing external-leakage of the viscous fluid thorough the threaded interface between the external threaded portion 152 of the lid 15 and the internal threaded portion 117 of the casing 11, and allows an increasing leeway for adjustment of the clearance gap G1, resulting in wider adjustment range of the damping torque. In addition, the axial force caused by the axial force generation members 17 enables tight engagement between the lid 15 and the casing 11, therefore preventing easy rotation of the lid 15 even under external force id applied in any of rotating directions of the lid 15.

In the present embodiment, the top surface 119 of the partition 115 is provided with the protrusion 18, and the axial force generation member 17 is provided with a pair of the arm portions 173 for pinching and grasping the protrusion 18. This allows easy attachment of the axial force generation member 17 to the corresponding partition 115.

In the present embodiment, the axial force generation member 17 is provided with the adjustment portion 174 located between the paired arm portions 173. The adjustment portion 174 is formed projecting toward the protrusion 18 on the top surface 119 of the corresponding partition 115 so as to be inserted in the groove 181 of the protrusion 18 to abut the groove bottom 182 of the groove 18, and the groove 181 of the protrusion 18 has such a size that plastic or elastic deformation can be caused in the distal end 176 of the adjustment portion 174. Therefore, screwing the lid 15 into the casing 11 causes the distal end 176 of the adjustment portion 174 to be push against the groove bottom 182 of the groove 181 and to be plastic or elastic deformed actively, thereby resulting in a leeway for adjustment of the clearance gap G1 to further increase.

In the present embodiment, a pair of the arm portions 173 of the axial force generation member 17 have the respective pushing portions 175 to be push into and against the grooves 184 defined in the both side surfaces 183 of the protrusion 18 formed on the top surface 119 of the partitions 115. These pushing portions 175 enable a pair of the arm portions 173 to grasp the axial force generation member 17 tightly so as not to drop the axial force generation member 17 from the protrusion 18. In addition, these pushing portions 175, together with the grooves 184 defined in both side surfaces 183 of the protrusion 18, act to ensure positioning as the axial force generation member 17 is to be attached to the protrusion 18, therefore resulting in appropriate attachment of the axial force generation member 17 to the protrusion 18.

In the present embodiment, the adjustment portion 174 of the axial force generation member 17 has, on the both sides 179 of its base portion 177, the pushing surfaces 178 to contact with and push against the both inner sidewalls 185 of the groove 181 of the protrusion 18. These pushing surfaces 178 provide a fit of the adjustment portion 174 within the groove 181 of the protrusion 18, thereby ensuring more reliable prevention of drop of the axial force generation member 17 from the protrusion 18.

Moreover, according to the present embodiment, resin excellent in sliding properties, such as polyamide, is used for the first seal member 13 and for the second seal member 14, and thereby the first seal member 13 and the second seal member 14 act as slide bearings each providing a slidable support for the outer circumferential surface 124 of the rotor body 121 of the rotor 12. This absorbs backlash caused, for example, due to misalignment of a hexagonal shaft for transmitting the external rotational force to the rotor 12, and allows the hexagonal shaft to rotate smoothly.

The present invention can include, but is not limited to, the above embodiment: it will be obvious to those skilled in the art that various changes may be made without departing from the scope of the invention.

For example, the above embodiments has been described including an example in which the clearance gap G1 between the back face 153 of the lid 15 and the top surface 129 of each vane 122 is also utilized as the flow passage for the viscous fluid in addition to the flow passage 126 defined in each vane 122; however, the present invention is not limited to this example. The axial force generation member 17 may be arranged so as not to close the clearance gap between the back face 153 of the lid 15 and the top surfaces 119 of each of the partitions 115, and thereby not only the clearance gap G1 between the back face 153 of the lid 15 and the top surface 129 of the vane 122 but also the clearance gap between the back face 153 of the lid 15 and the top surfaces 119 of each of the partitions 115 may be utilized as flow passages for the viscous fluid in addition to the flow passages 126 formed in the vanes 122.

The present embodiment has been described including an example in which the circular cylindrical chamber 111 is provides with a pair of the partitions 115 and the rotor 12 is provided with a pair of the vanes 122; however, the present invention is not limited to this example. As far as the partition(s) 115 in the circular cylindrical chamber 111 and the vane(s) 122 on the rotor 12 are resultantly the same in number, the number of the partition(s) 115 to be formed and the number of the vane(s) 122 to be formed, each may be one, or three or more.

In the present embodiment, each of the second seal members 14 attached to the vanes 122 functions as the check valve for opening and closing the flow passage 126 formed in the corresponding vane 122, but the present invention is not to the aspect. A check valve may be installed separately from the second seal member 14 such that it closes the flow passage 126 defined in the vane 122 when the rotor 12 rotates in the forward direction N relative to the circular cylindrical chamber 111 in the casing 11 and opens the flow passage 126 defined in the vane 122 when the rotor 12 rotates in the backward direction R relative to the circular cylindrical chamber 111 in the casing 11.

The present invention can include, but is not limited to, the present embodiment in which the vanes 122 includes the respective flow passages 126 each passing through the both side surfaces 127a, 127b of the corresponding vane 122 along the rotation directions of the rotor 12. Instead of or in addition to the vanes 122, the partitions 115 may include flow passages each passing through both side surfaces of the corresponding partition 115 along the rotation directions of the rotor 12. In this case, the check valves may be installed to close the flow passage defined in the corresponding partition 115 when the rotor 12 rotates in the forward direction N relative to the circular cylindrical chamber 111 in the casing 11 and to open the flow passage defined in the corresponding partitions 115 when the rotor 12 rotates in the backward direction R relative to the circular cylindrical chamber 111 in the casing 11.

In case of defining the flow passage in the partition 115, the first seal members 13 may each have a similar shape as that of the second seal member 14, namely a shape including the following portions: a bottom portion having a width lager than a circumferential length of an inner edge of the corresponding partition 115; a first leg portion integrally formed at one edge of the bottom portion and having a width larger than a radial width of the flow passage defined in the corresponding partition 115; and a second leg portion integrally formed at another edge of the bottom portion and having a width smaller than the radial width of the flow passage defined in the corresponding partition 115. The first seal member 13 may function as a check valve capable of operating as follows: when the rotor 12 rotates in the forward direction N relative to the circular cylindrical chamber 111 in the casing 11, the leg portion of the first seal member 13 abuts one side surface of the partition 115, thereby closing the flow passage formed in the partition 11; conversely, when the rotor 12 rotates in the backward direction R relative to the circular cylindrical chamber 111 in the casing 11, the first leg portion of the first seal member moves away from one side surface of the partition 115 and the second leg portion abuts another side surface of the partition 115, thereby opening the flow passage formed in the partition 115.

In case of defining no flow passage 126 in the vane 122, the second seal member 14 may have any shape as far as it can close the clearance gap between the front end surface 125 of the vane 122 and the sidewall surface 114 of the circular cylindrical chamber 111 in the casing 11.

The present embodiment has been described with, by way of an example, the so-called uni-directional rotary damper capable of causing a large damping torque during rotation of the rotor 12 in the forward direction N relative to the circular cylindrical chamber 111 in the casing 11 and of generating a small damping torque during rotation of the rotor 12 in the backward direction R relative to the circular cylindrical chamber 111 in the casing 11. However, the present invention is not limited to this example. The present invention is also applicable to so-called bi-directional rotary damper capable of causing a large damping torque in both the forward direction N and the backward direction R. In this case, the flow passages 126 are omitted from the vanes 122 of the rotor 12. Each of the second seal members 14 may only close the clearance gap between the front end surface 125 of the corresponding vane 122 and the sidewall surface 114 of the circular cylindrical chamber 111 in the casing 11.

The present invention can include, but is not limited to, the present embodiment in which the first seal members 13 are attached to the partitions 115 located in the circular cylindrical chamber 111 in the casing 11. The first seal members 13 may be omitted. Similarly, the second seal members 14 may be omitted although the second seal members 14 are attached to the vanes 122 of the rotor 12 in the present embodiment.

In the present embodiment, each of the axial force generation member 17 includes plastically or elastically deformable element and is located between the back face 153 of the lid 15 and the top surface 119 of the corresponding partition 115, and thus screwing the lid 15 into the casing 11 causes the axial force. However, the present invention is not limited to the present embodiment. The casing 11 may be made of thermoplastic resin and includes, as integral portion of the casing 11, such a protrusions on the top surface 119 of each partition 115 that abuts the back face 153 of the lid 15 to act as an axial force generation portion. In this case, screwing the lid 15 into the casing 11 causes the axial force generation portions (the protrusions) to generate an axial force, thereby preventing external-leakage of the viscous fluid thorough the threaded interface between the external threaded portion 152 of the lid 15 and the internal threaded portion 117 of the casing 11, and the axial force generation portions to be plastically or elastically deformed, thereby increasing a leeway for adjustment of the clearance gap G1 to result in wider adjustment range of the damping torque.

In the present embodiment, the internal threaded portion 117 is formed, as the first threaded portion, on the opening side 118 of the inner circumferential surface of the casing 11 (the sidewall surface 114 inside the circular cylindrical chamber 111), and the external threaded portion 152 is formed, as the second threaded portion, on the outer circumferential surface 151 of the lid 15 so as to engage with the internal threaded portion 117 of the casing 11. However, the present invention is not limited this aspect. For example, the lid 15 may have a bottle cap shape (a hollow cylindrical shape with bottom); in this case, an internal threaded portion may be formed, as a second threaded portion, on an inner circumferential surface of a hollow cylindrical portion of the lid 15, and an external threaded portion may be formed, as a first threaded portion, on the opening side 118 of the outer circumferential surface of the casing 11 so as to be engaged with the internal threaded portion of the lid 15.

The rotary damper 1 according to the present embodiment is widely applicable to seats with reclining function as used in, for example, automobiles, railroad vehicles, aircrafts, and vessels. Moreover, the rotary damper 1 is also widely applicable for any device other than seats with reclining function, as far as the device intends to provide dumping only in one-way rotation of a rotator capable of bi-directional rotation.

REFERENCE SIGNS LIST

1: rotary damper 11: casing; 12: rotor; 13: first seal member; 14: second seal member; 15: lid; 16a, 16b, 16c: O-ring; 17: axial force generation member; 18: protrusion; 111: circular cylindrical chamber; 112: bottom of the circular cylindrical chamber 111; 113: opening section of the circular cylindrical chamber 111; 114: sidewall surface inside the circular cylindrical chamber 111; 115: partition; 116: front end surface of the partition 115; 117: internal threaded portion; 118: opening side of the circular cylindrical chamber 111; 119: top surface of the partition 115; 121: rotor body; 122: the vane; 123a, 123b: end portion of the rotor body 121; 124: outer circumferential surface of the rotor body; 125: front end surface of the vane 122; 126: flow passage; 127a, 127b: side surface of the vane 122; 128: through hole in the rotor body 121; 129: top surface of the vane 122; 130: bottom portion of the first seal member 13; 140: bottom portion of the second seal member 14; 141, 142: edge of the bottom portion 140 of the second seal member 14; 143: first leg portion of the second seal member 14; 144: second leg portion of the second seal member 14; 150: opening section of the lid 15; 151: outer circumferential surface of the lid 15; 152: external threaded portion; 153: undersurface of the lid 15; 170: body of the axial force generation member 17; 171: top surface of the body 171; 172: undersurface of the body 17; 173: arm portion; 174: adjustment portion; 175: pushing portion; 176: distal end of the adjustment portion 174; 177: base portion of the adjustment portion 174; 178: pushing portion; 179; side of the base portion 177; 180: top surface of the protrusion 18; 181: groove; 182: groove bottom; 183: side surface of the protrusion 18; 184: groove; 185: inner sidewall of the groove 181

The invention claimed is:
1. A rotary damper for limiting a movement of a viscous fluid to generate a damping torque in reaction to a rotating force applied, the rotary damper comprising:
a casing having an opening end on one side and including a circular cylindrical chamber defined inside, the circular cylindrical chamber being filled by the viscous fluid;

a rotor being placed in the circular cylindrical chamber and being rotatable relative to the circular cylindrical chamber; and
a lid attached to the opening end of the casing and keeping the rotor together with the viscous fluid sealed inside the circular cylindrical chamber;
the rotor comprising:
a rotor body in cylindrical shape; and
a vane projecting radially outward from an outer circumferential surface of the rotor body and placing a front end surface of the vane close to a sidewall surface inside the circular cylindrical chamber to partition an inside of the circular cylindrical chamber;
the casing comprising:
a partition projecting radially inward from the sidewall surface inside the circular cylindrical chamber and placing a front end surface of the partition close to the outer circumferential surface of the rotor body to partition the inside of the circular cylindrical chamber; and
a first threaded portion formed on the opening end of the casing;
the lid comprising a second threaded portion formed on the lid and engaged with the first threaded portion formed on the opening end of the casing; and
the rotary damper further comprising an axial force generation member, the axial force generation member including a plastically or elastically deformable element and being located between a back face of the lid and a facing surface of the partition to the back face of the lid so that screwing the second threaded portion of the lid onto the first threaded portion of the casing causes the axial force generation member to generate an axial force;
wherein a clearance gap adjustable by way of adjustment of a screwing amount of the second threaded portion of the lid onto the first threaded portion of the casing is defined between the back face of the lid and the facing surface of the vane to the back face of the lid to act as a flow passage for limiting the movement of the viscous fluid.

2. A rotary damper according to claim 1,
wherein the partition comprises, on the facing surface to the back face of the lid, a protrusion for attaching the axial force generation member to the partition.

3. A rotary damper according to claim 2,
wherein the axial force generation member further comprises an adjustment portion projecting toward the protrusion; and
the protrusion comprises an insertion portion having a bottom to contact with a distal end of the adjustment portion of the axial force generation member inserted in the insertion portion.

4. A rotary damper according to claim 3,
wherein the distal end of the adjustment portion is narrower than a base portion of the adjustment portion;
the adjustment portion comprises a pushing portion formed on the base portion of the adjustment portion and pushing against a sidewall surface in the insertion portion.

5. A rotary damper according to claim 4, wherein
the axial force generation member comprises a pair of arm portions pinching and grasping the protrusion.

6. A rotary damper according to claim 5,
wherein the pair of the arm portions each comprise a pushing portion pushing against a side surface of the protrusion.

7. A rotary damper according to claim 3, wherein
the axial force generation member comprises a pair of arm portions pinching and grasping the protrusion.

8. A rotary damper according to claim 7,
wherein the pair of the arm portions each comprise a pushing portion pushing against a side surface of the protrusion.

9. A rotary damper according to claim 2, wherein
the axial force generation member comprises a pair of arm portions pinching and grasping the protrusion.

10. A rotary damper according to claim 9,
wherein the pair of the arm portions each comprise a pushing portion pushing against a side surface of the protrusion.

11. A rotary damper according to claim 2, further comprising a first seal member filling in a clearance gap between the front-end surface of the partition and the outer circumferential surface of the rotor body.

12. A rotary damper according to claim 2, further comprising a second seal member sealing a clearance gap between the front-end surface of the vane and the sidewall surface inside the circular cylindrical chamber.

13. A rotary damper according to claim 2, further comprising:
a first flow passage defined in the partition to pass through both side surfaces of the partition along rotation directions of the rotor; and
a first check valve configured to close the first flow passage upon rotating the rotor in a forward direction relative to the circular cylindrical chamber and to open the first flow passage upon rotating the rotor in a backward direction relative to the circular cylindrical chamber.

14. A rotary damper according to claim 2, further comprising:
a second flow passage define in the vane to pass through both side surfaces of the vane along rotation directions of the rotor; and
a second check valve configured to close the second flow passage upon rotating the rotor in a forward direction relative to the circular cylindrical chamber and to open the second flow passage upon rotating the rotor in a backward direction relative to the circular cylindrical chamber.

15. A rotary damper according to claim 1,
wherein the casing is made of thermoplastic resin; and
the axial force generation member is integrally formed with the partition.

16. A rotary damper according to claim 15, further comprising a first seal member filling in a clearance gap between the front-end surface of the partition and the outer circumferential surface of the rotor body.

17. A rotary damper according to claim 1, further comprising a first seal member filling in a clearance gap between the front-end surface of the partition and the outer circumferential surface of the rotor body.

18. A rotary damper according to claim 1, further comprising a second seal member sealing a clearance gap between the front-end surface of the vane and the sidewall surface inside the circular cylindrical chamber.

19. A rotary damper according to claim 1, further comprising:
a first flow passage defined in the partition to pass through both side surfaces of the partition along rotation directions of the rotor; and
a first check valve configured to close the first flow passage upon rotating the rotor in a forward direction relative to the circular cylindrical chamber and to open the first flow passage upon rotating the rotor in a backward direction relative to the circular cylindrical chamber.

20. A rotary damper according to claim 1, further comprising:
a second flow passage define in the vane to pass through both side surfaces of the vane along rotation directions of the rotor; and
a second check valve configured to close the second flow passage upon rotating the rotor in a forward direction relative to the circular cylindrical chamber and to open the second flow passage upon rotating the rotor in a backward direction relative to the circular cylindrical chamber.

* * * * *